United States Patent
Langer

[15] 3,666,792
[45] May 30, 1972

[54] POLYMERIC TETRAHALOTEREPHTHALATE ESTERS

[72] Inventor: Stanley H. Langer, Madison, Wis.
[73] Assignee: Wisconsin Alumni Research Foundation, Madison, Wis.
[22] Filed: Oct. 13, 1969
[21] Appl. No.: 865,797

[52] U.S. Cl. ..........................260/475 P, 55/67, 260/475 R, 260/475 F
[51] Int. Cl. ...........................................................C07c 69/82
[58] Field of Search ..............................260/475 P, 475 F, 70

[56] References Cited

UNITED STATES PATENTS

| 2,075,107 | 3/1937 | Frazier | 260/475 |
| 2,940,855 | 6/1960 | Beavers et al | 260/475 |

OTHER PUBLICATIONS

Groggins, Unit Processes in Organic Synthesis, 4th Edition, p. 623–624 (1952)

Primary Examiner—Lorraine A. Weinberger
Assistant Examiner—E. Jane Skelly
Attorney—McDougall, Hersh, Scott & Ladd

[57] ABSTRACT

Dimers, trimers, other oligomers, and polymers of tetrahaloterephthalate esters and gas-liquid chromatographic separations using same as the stationary liquid phase.

3 Claims, 1 Drawing Figure

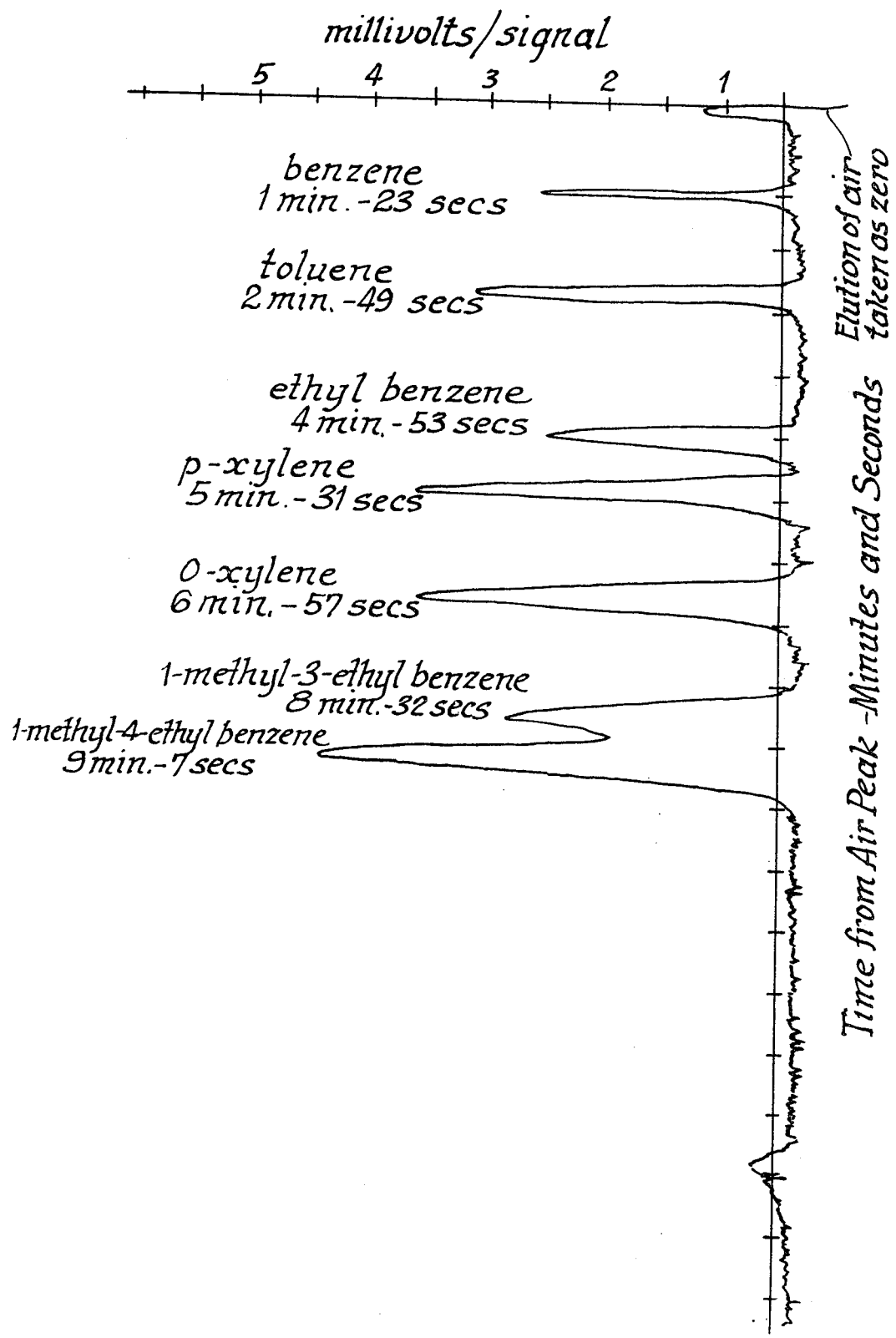

POLYMERIC TETRAHALOTEREPHTHALATE ESTERS

This invention relates to dimers, trimers and further oligomers of tetrahaloterephthalate esters and to methods for the preparation of same and it relates more particularly to a new and improved process of gas-liquid chromatography using the oligomers of the tetrahaloterephthalate esters as the liquid phase.

In previous publications of which I am co-author, namely, "Gas-Liquid Chromatographic resolution of m- and p-xylene: Tetrahalophthalate Liquid Phases," Chemistry and Industry, 1958, pages 1,145–1,147, description is made of gas-liquid chromatographic separation studies in which use is made of a homologous series of di-n-alkyl tetrachlorophthalate esters as the stationary liquid phase, with successful separation of meta- and paraxylenes. In "Gas-Liquid Chromatographic Study of the Thermodynamics of Solution of Some Aromatic Compounds," Journal of Physical Chemistry, 72, Nov. 1968, pages 4,020–4,030, description is made of possible separation of m- and p-methyl ethyl benzenes because of their high separation factors.

It is an object of this invention to provide a series of compounds which are believed to be new and which are capable of use as the liquid phase in chromatographic separation of organic gases and fluids which are otherwise difficult to separate, thereby to provide a new and improved chromatographic separation process.

The new compounds of this invention may be identified as oligomers or polymers of tetrahaloterephthaloyl halide esters, hereinafter referred to as the dimers, trimers and further polymers of tetrahaloterephthalate esters in which the halo groups may be bromo and preferably chloro, or fluoro, and in which the terminal ester groups are alkyl groups or cycloalkyl groups having from one to 20 and preferably one to 12 carbon atoms, such as methyl, ethyl, decyl and the like, and preferably propyl, butyl, pentyl to octyl and the like alkyl groups or cyclohexylmethyl, cyclohexylethyl, cyclohexylbutyl, hepta-fluorobutyl, pentafluorophenyl and the like cycloalkyl groups, or aromatic groups such as phenyl, benzyl, ethylbenzyl or other alkaryl groups, in which the alkyl or cycloalkyl or alkaryl groups contain from one to 20 carbon atoms and may be substituted with fluoro, chloro, bromo or hydroxy groups. The connecting groups are difunctional, such as ethylene, propylene, etc., branched or straight chained, or cycloalkylene, such as cyclohexyldimethylene.

The compounds of this invention may be represented by the general formula

in which X is

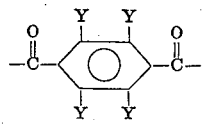

in which Y is a halogen preferably chlorine or fluorine, and R and R'' is hydrogen, an alkyl group, a cycloalkyl group or alkaryl group or substituted derivatives thereof in which the substituent on the alkyl group is a halogen such as fluoro, chloro, bromo or hydroxyl and in which the alkyl group has from one to 20 and preferably one to 12 carbon atoms as defined above; and R' is a difunctional alkyl, cycloalkyl, alkaryl group such as propylene, cyclohexyldimethylene, phenyl, xylyl and the like having from one to 20 and preferably one to 12 carbon atoms in the alkyl group and halogen substituted derivatives thereof as illustrated above and in which $n$ is a number of from 1 to 25. Under some circumstances, an oxygen or other linkage may be substituted for a $CH_2$ group in these alkyl chains.

It has been found that such polymers remain sufficiently electron-poor so as to contribute to selectivity by interacting with electron-rich compounds in charge transfer and similar interactions, and therefore may be of use in the stationary phase in chromatography; and, in addition, such compounds are found to be better adapted for use as the stationary phase in gas-liquid chromatography by reason of their desirably low vapor pressure while remaining in the liquid phase at reasonable operating temperatures for chromatographic separations. When use is made of such dimers, trimers, oligomers or higher polymeric tetrahaloterephthalate esters as the stationary phase in chromatographic separations, it is desirable to make use of a polymer which is in the form of a liquid at operating temperatures, usually within the range of temperatures up to 225° C. For this purpose, the stationary or liquid phase is usually selected of such dimers, trimers or other polymeric tetrahaloterephthalate esters or mixtures thereof having molecular weight average up to 10,000 and preferably a molecular weight average which is below 5,000. Such polymers have been found also to be more selective than their corresponding monomers.

Use of the dimer, trimer, oligomer or other polymeric tetrahaloterephthalate esters, as the liquid phase in chromatographic separations, can be made in columns of the types described in the aforementioned articles or as described in the recently issued U.S. Pat. No. 3,374,606 and U.S. Pat. No. 3,374,607, in which a support, such as diatomaceous earth, celite, firebrick, glass beads, and the like are wet or coated with the dimer, trimer or other polymer of the tetrahaloterephthalate esters of this invention or mixtures of these compounds.

In practice, the material to be resolved, either alone or with a suitable inert sweep fluid, such as nitrogen, argon, helium, hydrogen, or the like gaseous material, is advanced through a column packed with a support wet with the liquid stationary phase. In response to contact with said liquid phase, one or more of the materials to be resolved is retarded in its travel through the column so that it emerges from the column substantially separated from that fraction of the materials which is not equally retarded by the liquid phase material.

Such separations can also be carried out in a batch operation or in a semi-continuous operation. Effective separations can be achieved between materials having a separation factor as low as 1.04, as measured by the relative retention volumes between the materials at operating temperature. For example, effective separation can be achieved at 110° C. with a mixture of the trimer (40.4 percent)

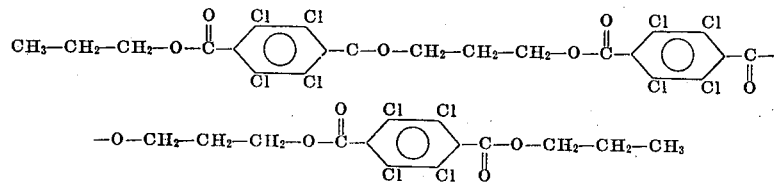

and the dimer (59.6%)

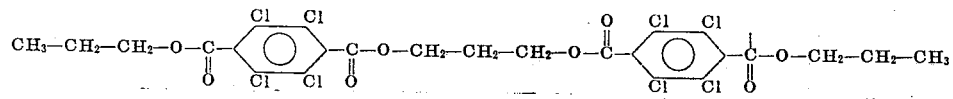

between a mixture of m-xylene having a relative retention volume at 110° C. (toluene) of 1.8439 and p-xylene having a relative retention volume at 110° C. of 1.9517 to give a separation factor of 1.058 or which have relative retention values at 130° C. of 1.7331 and 1.8225, respectively, to give a separation factor of 1.050; or between 1-methyl-3-ethyl benzene and 1-methyl-4-ethyl benzene having relative retention volumes at 110° C. of 2.9050 and 3.1341, respectively, to give a separation factor of 1.078, or relative retention values at 130° C. of 2.6193 and 2.8007, respectively, to give a separation factor of 1.072.

Widespread use can be made of the dimer, trimer, oligomer, or other polymer, or mixtures of the tetrahaloterephthalate esters of this invention as the liquid phase in the chromatographic separation of other mixture of organic compounds which are otherwise difficult to separate, by such conventional means as fractional crystallization, fractional distillation, selective solvency and the like. For example, separation can be achieved between isomers having boiling points that differ only by a degree or two and are incapable of effective separation by distillation. Effective use can be made in the separation of essential oils which represent expensive materials in which purification by separation is most desirable but which have been difficult to separate by other techniques.

Having set forth the basic concepts of this invention, description will now be made by way of examples for the preparation of compounds of this invention and their use in chromatographic separations.

EXAMPLE 1

4-Carbopropoxy-2,3,5,6-tetrachlorobenzoic acid (intermediate)

A 250 ml. two neck flask containing 75 ml. of dioxane and 34.0 g. (0.10 mole) of 2,3,5,6-tetrachloroterephthaloyl chloride (m.p., 147.0–148.0) was heated until the solid dissolved. To this stirred solution was added 9.38 ml. (0.125 mole) of n-propanol. In the center neck of the flask was a reflux condenser protected with a drying tube. The side neck was fitted with a dropping funnel containing 10.1 ml. (0.125 mole) of pyridine in 25 ml. of dioxane. The pyridine was added to the refluxing solution over a 4 hour period during which the reaction mixture turned from clear and colorless to orange and cloudy. The following day the mixture was refluxed for 6 hours. The solid that separated was removed by filtration, washed with 25 ml. of dioxane, and dried yielding Crop I, 16.1 g., m.p. 112°–135° C.

The filtered reaction mixture was allowed to stand for 17 days but no more crystals formed in the flask. The mixture was then hydrolyzed by adding 20 ml. of 2 M KOH (0.04 mole) and stirring for 24 hours followed by heating to 50° C. and stirring for 5 hours during which more KOH was added periodically. The solution was tested with pH paper and when the mixture became acidic more base was added. A total of 85 ml. of 2 M KOH were added. The mixture was somewhat cloudy during hydrolysis. When the mixture was finally made basic the color changed from orange to dark red. This was then allowed to stir overnight at room temperature.

The hydrolyzed reaction mixture was poured into 1000 ml. of water and acidified with 50 ml. of 6 N $H_2SO_4$. The reaction products were separated by extraction with four 150 ml. portions of ether. The aqueous layer was discarded. The other was washed with three 100 ml. portions of water to remove the dioxane. The acidic compounds were extracted during six 100 ml. portions of water — 15 ml. 2 M KOH mixture. The ether layer was washed once with water containing a small amount of $H_2SO_4$ to remove any base and to convert any acidic compounds to the acid form if they were still present. This layer was then dried over $MgSO_4$, filtered and the ether distilled leaving a residue of neutral compounds. It was recrystallized from 30 ml. of ethanol to give 7.1 g. (0.010 mole) of impure di-n-propyl-2,3,5,6-tetrachloroterephthalate, m.p. 86°–88.5° C., confirmed by mixed melting point.

The base extract containing the acidic compounds was acidified with 60 ml. of 6 N $H_2SO_4$ and extracted with four 100 ml. portions of ether. The aqueous phase was discarded. The ether layers were dried over $MgSO_4$, filtered, and distilled leaving Crop III, 26.1 g., m.p. 135°–140° C. This was put into an extraction thimble and extracted with n-heptane for about 8 hours in a Soxhlet extractor. The heptane extract yielded 14.5 g. (0.042 mole) of fairly pure half ester in two crops. Recrystallization from n-heptane gave pure title compound, m.p. 152.0°–153.0° C. Total yield, based on acid chloride, 43.2 percent.

Neutralization equivalent. Calculated: 345.99. Found: 346.2.

EXAMPLE 2

1,3-Propane-bis(4-carbobutoxy-2,3,5,6-tetrachlorobenzoate)

A mixture of 25 ml. of purified thionyl chloride and 10.8 g. (0.03 mole) of the intermediate, 4-carbobutoxy-2,3,5,6-tetrachlorobenzoic acid, prepared similar to Example 1, was refluxed for 4 hours. The excess thionyl chloride was removed with an aspirator and a dry air stream followed by successive distillation of 10 ml. of benzene and 15 ml. of n-heptane in a similar manner.

A weighed amount of 1,3-propanediol which had been previously dried by azeotropic distillation with benzene was diluted to 100.00 ml. with dried dioxane. The required amount of diol, 1.065 g. (0.014 mole), was added to the acid chloride by pipetting 27.00 ml. of the dioxane solution into the reaction flask. The acid chloride dissolved immediately. Next, 2.42 ml. (0.03 mole) of pyridine were added causing the reaction mixture to warm and cloud immediately. White crystals formed within 2 minutes. After 8 days of standing the reaction mixture was refluxed for 10-½ hours. A red oil which separated during the reflux solidified on cooling. The following day the solid was filtered, washed with 40 ml. of dioxane, and dried in a vacuum desiccator yielding 3.3 g. (0.029 mole) of pyridine hydrochloride, m.p. 139°–144° C. The filtered reaction mixture was refluxed for 2-¼ hours and cooled but no crystals formed.

The mixture was then hydrolyzed to destroy excess acid chloride by heating to 50° C. and stirring with 10 ml. of water and 2 ml. of 2 M KOH. After 4 hours the hydrolyzed mixture was poured into 650 ml. of water containing 5 ml. of 6 N $H_2SO_4$. This was extracted with four 100 ml. portions of ether and discarded. The ether layer was washed several times with water to remove any remaining dioxane. The acidic compounds, mainly half ester, were removed by extracting with dilute KOH. The ether layer which now contained only neutral compounds was washed with water, dried over $MgSO_4$, filtered, and distilled leaving Crop I, 10.4 g., m.p. 92°–97° C.

Crop I was nearly dissolved in 100 ml. of hot absolute ethanol and the insoluble material was removed by suction filtration giving 0.1 g., m.p. 166°–176° C. The filtrate was reheated, an additional 50 ml. of ethanol added, and allowed to cool. The crystals were removed by filtration and dried giving Crop III, 7.8 g., m.p. 102°–104° C. This was dissolved in 100 ml. of hot ethanol and cooled and the resulting crystals were collected and dried yielding Crop IV, 7.0 g., m.p. 102.5°–104.0° C. The material was purified in batches by dissolving in a relatively large volume of hot ethanol, about 300 ml. per gram, and cooling. The crystals that formed on the first crystallization were relatively impure, m.p. 104.0°–106.0° C. The filtrate was then distilled down to a volume of about 50 ml. and cooled. The crystals that formed in this solution had m.p. 107.0°–108.0° C., and totaled 5.5 g., 55 percent yield based on diol.

Elemental analysis. Calculated for $C_{27}H_{24}O_8Cl_8$: C, 42.66; H, 3.18; Cl, 37.31. Found: C, 42.39; H, 3.24; Cl, 36.90.

EXAMPLE 3

1,4-Butane-bis(4-carbobutoxy-2,3,5,6-tetrachlorobenzoate)

To a 100 ml. flask was added 7.2 g. (0.020 mole) of 4-carbobutoxy-2,3,5,6-tetrachlorobenzoic acid of Example 1 (m.p. 135.2 – 136.0) and 30 ml. of thionyl chloride. The half ester dissolved immediately. The yellow solution was refluxed for 4-¾ hours and the excess $SOCL_2$ was removed with an aspirator and a dry air stream. When this was finished, 10 ml. each of benzene and heptane were removed in a similar fashion. The resulting half ester acid chloride was viscous, yellow oil. A weighed amount of 1,4-butanediol was diluted to 100 ml. with dioxane in a volumetric flask and a little less than the required amount of diol was added to the reaction flask by pipetting the dioxane solution. A total of 0.721 g. (0.008 mole) of 1,4-butanediol in 31 ml. of dioxane was added to the half ester acid chloride. A clear yellow solution resulted. Next, 1.61 ml. (0.02 mole) of pyridine was added causing the reaction mixture to cloud and heat within 5 seconds. Crystals were present after standing 4 hours. The mixture was refluxed for 3 hours after 4 days of standing and then allowed to stand for 5 more days.

The crystals were filtered off and washed with 25 ml. of dioxane to give Crop I, 2.4 g., consisting of two types of crystals. The remaining reaction mixture was hydrolyzed to reconvert half ester acid chloride to half ester so that it could be removed via base extraction. The hydrolysis consisted of about 20 hours of stirring in the presence of 5 ml. of water and 3 ml. of 2 M KOH followed by 2 hours of heating at 50° C. The mixture was slightly cloudy during the hydrolysis procedure. The reaction mixture was poured into 500 ml. of water and this was made acidic with 6 N $H_2SO_4$. Crop I was also added to the water and the whole mixture was extracted with 350 ml. of chloroform in three portions. The aqueous layer was discarded.

The chloroform layer was washed with two 100 ml. portions of water to remove dioxane. The chloroform was next extracted with five portions of 100 ml. water — 2 ml. 2 M KOH. The chloroform layer was then washed with 100 ml. of water containing 2 ml. of 6 N $H_2SO_4$ and finally two 100 ml. portions of water. The extracted and washed chloroform layer, containing the neutral compounds, was dried over $MgSO_4$, filtered, and the solvent removed by distillation giving Crop II, 7.5 g., m.p. 160°–170° C.

The KOH extract containing the acidic compounds was acidified with 6 N $H_2SO_4$ and extracted with two 100 ml. portions of chloroform. The aqueous layer was discarded. The chloroform layer was dried over $MgSO_4$, filtered, and solvent removed to give Crop III, 1.2 g., m.p. 90°–111° C. This material was recrystallized from n-heptane to give two crops of impure half ester, m.p. 127°–131° and 132.5°–134.0° C. with no apparent loss.

Crop II was boiled with 50 ml. of absolute ethanol but all of the solid would not dissolve. After cooling, the white solid was filtered off to give Crop IV, 4.3 g., m.p. 180.5°–182.0° C.

Crop IV, containing the desired diol diester, was recrystallized several times from acetone yielding pure material, m.p. 185.0°–186.0° C. Crude yield, 69 percent, based on limiting diol. For recrystallization, 50 ml. of acetone were used per gram of solid.

Elemental analysis. Calculated for $C_{28}H_{26}O_8Cl_8$: C, 43.44; H, 3.39; Cl, 36.64. Found: C, 43.34; H, 3.24; Cl, 36.76.

EXAMPLE 4

Propyl 3-hydroxypropyl tetrachloroterephthalate (intermediate)

To 12.12 g. (0.035 mole) of carbopropoxy-2,3,5,6-tetrachlorobenzoic acid of Example 2 was added 25 ml. of thionyl chloride. After warming on a steam bath for 4 hours, the solution was allowed to stand overnight and the excess thionyl chloride and sulphur dioxide was removed by distillation. To this was added 2.51 g. (0.033 mole) of anhydrous propylene glycol in a 23 ml. solution of dioxane with stirring. After warming to make a homogeneous solution, 2.76 g. of pyridine (0.35 mole) was added and allowed to stand. Two days later, the reaction mixture was added to an additional 0.0233 mole of 4-carbopropoxy-2,3,5,6-tetrachlorobenzoyl chloride in 25 ml. of dioxane, prepared from thionyl chloride and 4-carboxypropyl-2,3,5,6-tetrachlorobenzoic acid. Two days later, 15 ml. of 1,3-propylene glycol was added followed by 3 ml. of pyridine. The reaction mixture was transferred to a 250 ml. reaction vessel from whence 80 ml. of solvent were distilled. The remaining solution was cooled, poured into a separatory funnel with 500 ml. of water and extracted with four 100 ml. portions of ether after acidification with 10 ml. of 6 N sulphuric acid. The ether layers were then extracted with four 100 ml. fractions of 0.12 N sulphuric acid. Then the ether layers were extracted with three 100 ml. fractions of 0.03 N potassium hydroxide. The ether extract was washed with an acidified aqueous fraction and then water. It was dried with magnesium sulfate, filtered, and evaporated to give 23.9 g. of impure material with m.p. 81°–89° C. Four grams of this was chromatographed on 80 grams of 60–200 mesh silica gel. The eluting solvent was gradually changed from hexane to hexane-benzene to benzene to dichloromethane-benzene to 10 percent ethyl acetate-dichloromethane, using successive 50 ml. eluting fractions. In the ethyl acetate-dichloromethane fraction 2.55 grams of material was found which could be crystallized from 100 ml. of heptane to give 1.7 g. of propyl 3-hydroxylpropyl tetrachloroterephthalate, m.p. 112°–114° C. An analytical sample was prepared using a similar procedure, except that the impure fraction was recrystallized 3 times from heptane to give material of m.p. 114.8°–116.5° C. which gave a correct elementary analysis.

EXAMPLE 5

Synthesis of Compound 1,3-Propane bis(4-carbopropoxy-2,3,5,6-tetrachlorobenzoate)

To a 100 ml. flask was added 6.06 g. (0.0175 mole) of 4-carbopropoxy-2,3,5,6-tetrachlorobenzoic acid of Example 1, 18 ml. of thionyl chloride and 1 drop of pyridine. After refluxing for 5 hours the thionyl chloride was removed by distillation using aliquots of benzene and heptane to help in removal. To this, was added 0.624 g. (0.0082 mole) of dry 1,3 propanediol in 21.6 ml. of dioxane. When the solid had dissolved, 1.41 ml. (0.0175 mole) of pyridine was added. The clear yellow solution clouded and became warm. After 10 days of standing many crystals had formed and the mixture was refluxed for 5 hours.

Two days later the reaction mixture was added to 300 ml. of water and extracted with three portions of ethyl ether totaling 350 ml.

The ether layer was then extracted with 100 ml. of 0.12 normal aqueous sulphuric acid and 100 ml. of 0.04 normal aqueous potassium hydroxide. After washing to remove acid and base residues, the ether solution was dried with magnesium sulfate and evaporated to give 6.4 g. of solid material.

The 6.4 g. of material was dissolved in 50 ml. of fresh dioxane and 15 ml. of water with 1 ml. of 2 molar potassium hydroxide. The cloudy solution was allowed to stir overnight to hydrolyze any remaining chloride derivative. This solution was then acidified and extracted with ether. The ether solution was then extracted with dilute base and water until the aqueous wash was clear. Finally, the ether layer was dried with magnesium sulfate and evaporated to dryness to give 5.5 g. of material, Crop I.

Crop I was then recrsytallized from 75 ml. of absolute ethanol. The recovered solid was then recrystallized from another 75 ml. of ethanol to give 3.6 g. of material, Crop V, with m.p. 118°–120° C. Additional material precipitated out on standing, 0.2 g., m.p. 120.5°–122°, and later 0.1 g., Crop VII, m.p. 125°–126°, on reducing volume to 20 ml.

Crop V was dissolved in 200 ml. of boiling absolute ethanol, treated with charcoal, further diluted to 400 ml. of boiling ethanol and fractionally crystallized with reduction in volume to give a number of small crops with melting points in the range of 115° to 125° C. Liquid elution chromatography of these small crops on 60–200 mesh silica gel resulted in isolation of product. The elution chromatography was initiated with hexane. Eluant composition was charged to benzene in incremental steps. Product was found in the benzene eluant with m.p. in the 122.2°–127° range. Much of this was recrystallized from ethanol to raise the melting point to the 126°–128° range. The best material had m.p. 127°–128° and gave the correct elementary analysis for the title compound. A total of 2.49 g. was recovered with m.p. in the 123.5°–128° m.p. range. This is equivalent to a theoretical yield of about 41 percent.

EXAMPLE 6

Synthesis of Di-(3-hydroxypropyl)tetrachloroterephthalate (intermediate)

A mixture of 34.4 g (0.1 mole) of tetrachloroterephthaloyl chloride in 85 ml. of dried tetrahydrofuran and 100 ml. of dried dioxane gave a clear solution in a 500 ml. flask. Then, about 76 g. of propanediol (73 ml.) was added dropwise to the solution with stirring over a period of 15 minutes. This was followed by dropwise addition of 17.4 g. (0.22 mole) of pyridine over a period of 1 hour. The solution changed from light green to dark green. Stirring was continued. The solution turned dark red and finally amber after 3 hours. Overnight, stirring was stopped and the solution was yellow on the next day when it was stirred for 8 hours. After 2 weeks, a total of about 150 ml. of distillate were removed at a head temperature of 86° to 120° C. Four days later the solidified mixture in the flask was mixed with successive approximately 200 ml. fractions of ether-benzene mixture (2:1 by volume) to a total of 900 ml. of extractant. This was followed by additional extraction with ether-benzene mixture (1:1 by volume) to a total of 800 ml. The ether-benzene solutions were washed with water, then with a total of 1,100 ml. of water containing 9 ml. of 6 N sulphuric acid. The acid was then removed by aqueous washing. The ether-benzene solutions were dried with anhydrous magnesium sulfate and filtered.

From the first 200 ml. fraction of ether-benzene extractant, 2.3 g. of product, m.p. 160.5°–165°, precipitated out on evaporation to 50 ml. From the other combined fractions, two crops were collected on evaporation of the ether-benzene mixture, one at a volume of ~ 700 ml., 13.1 g., m.p. 163°–166°, a second at a volume of 200 ml., 25.1 g. with m.p. 148°–163° C. This second crop was recrystallized from benzene to give 12.5 g. of material with m.p. 160°–164° C. Thus, a total of 27.9 g., or 67 percent of crude product was obtained. This could be recrystallized readily from benzene and sometimes extracted with dilute aqueous sodium hydroxide, 0.02 molar, to give material of greater purity with m.p. 165°–167° C. Material obtained from another similar preparation and recrystallized three successive times from benzene gave pure product with m.p. 166.5°–168.5° C. which gave the correct elementary analysis after standing in a desiccator in the presence of Molecular Sieves for several days.

EXAMPLE 7 bis(4-carbopropoxy-2,3,5,6-tetrachlorobenzoyl-3-propyl)tetrachloroterephthalate

To a solution of 1.881 g. (0.00553 mole) of terephthaloyl chloride in 25 ml. of dioxane, a solution of 4.244 g. (0.0105 mole) of propyl, 3-hydroxylpropyl tetrachloroterephthalate in 20 ml. of dioxane was added. To this stirred solution, 0.87 g. (0.011 mole) of pyridine in dioxane was added dropwise. The solution clouded, warmed slightly and cleared. The reaction mixture, now slightly yellow, was stirred with a magnetic stirring bar and heated gently at about 50° C. for 3 hours. After 26 days, a small white precipitate of about 0.65 g. was filtered off and washed with 25 ml. of dioxane and 60 ml. of ether which was added to the reaction mixture. After another week, the ether and 40 ml. of dioxane were removed by distillation.

The reaction mixture was poured into a one liter separatory funnel with 300 ml. of water and 10 ml. of 6 N sulphuric acid. The solution was separated and the aqueous layer was extracted with four 100 ml. aliquots of ether. The combined ether extracts were extracted with three 100 ml. aliquots of 0.12 N H₂SO₄ followed by five successive 100 ml. fractions of water washes. Separation finally gave an ether fraction A and an intermediate fraction B which was combined with another 100 ml. fraction of ether and washed again with three 200 ml. fractions of water. This fraction now gave another ether layer C and an intermediate layer D. Layer D was combined with another 400 ml. of ether and kept separately.

Ether solutions A and C were dried with magnesium sulfate and evaporated to dryness to give 1.83 g., m.p. 108°–124° C. and 2.10 g., m.p. 108.2°–127.0° C. The 1.83 g. fraction was successively recrystallized from butanol, propanol and ethanol to give 1.1 g with m.p. 143.8°–146.2° C. Further recrystallization from ethanol gave a fraction with m.p. 148.0°–149.5° which gave the correct elementary analysis for (I). Other fractions with m.p. in the 144°–152.5° range were obtained by fractional crystallization from ethanol.

EXAMPLE 8

The tetramer can be produced by the reaction of the intermediate of Example 4, having the formula

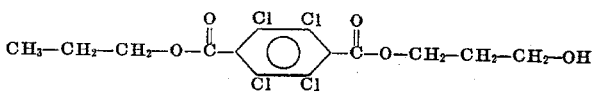

with tetrachlorophthaloyl chloride having the formula

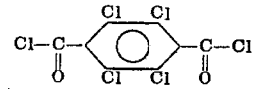

The reaction is carried out in the presence of dioxane and benzene or pyridine, in a manner similar to Example 1, to yield

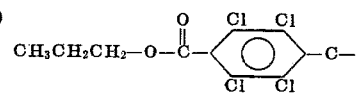

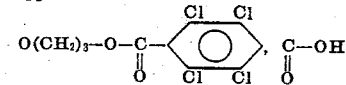

intermediate.

This can be reacted with 1,3-propanediol as in Example 2 to yield tetramer $$CH_3CH_2CH_2O-X-O-(CH_2)_3-O-X-O(CH_2)_3-O X-O(CH_2)_3-OX-O CH_2CH_2CH_3$$

where X is

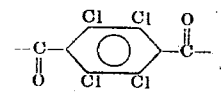

EXAMPLE 9

The intermediate of Example 6 having the general formula

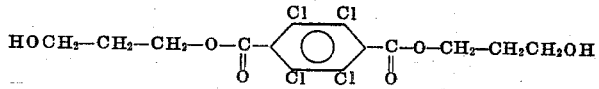

can be reacted with a mole of tetrachlorophthaloyl chloride under the conditions described in Example 6 to form a trimer intermediate $$HO\ CH_2CH_2CH_2O-X-O(CH_2)_3-O-X-O-(CH_2)_3-O-X-O\ CH_2CH_2CH_2-OH$$

where X is

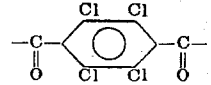

EXAMPLE 10

The trimer of Example 9 is end-blocked with the intermediate of Example 1, 4-carbopropoxy-2,3,5,6-tetrachlorobenzoic as in Example 2. The final reaction is carried out in the presence of dioxane and pyridine to form the corresponding pentamer after first converting the intermediate of Example 1 to chloride with thionyl chloride. The product would be $$CH_3CH_2CH_2-O-X-O(CH_2)_3-OX-O(CH_2)_3-$$
$$OX-O(CH_2)_3-OX-O(CH_2)_3-O$$
$$|$$
$$X$$
$$|$$
$$CH_3CH_2CH_2O$$

where X is

[structure: tetrachlorophenylene with -C(=O)- groups on each side]

EXAMPLE 11

The compound $$CH_3CH_2CH_2-\text{[tetrachlorophenyl]}-C(=O)-OH$$

is reacted with thionyl chloride, as in Example 4, to form the corresponding chloride and the reaction product is further reacted with the compound of Example 6

$$HOCH_2-CH_2-CH_2-O-C(=O)-\text{[tetrachlorophenyl]}-C(=O)-O-CH_2-CH_2CH_2OH$$

in the presence of dioxane and pyridine to split out HCl and form a dimer $$CH_3\ CH_2CH_2-OX-O(CH_2)_3-OX-O\ CH_2CH_2CH_2OH$$

The corresponding trimer can be formed by reaction of the chloride of the first compound with 2 moles of the latter in the presence of dioxane and pyridine.

EXAMPLE 12

The intermediate of Example 4 is reacted in the presence of paratoluene sulfonic acid with a molecular equivalent of tetrafluoroterephthalic acid in a conventional esterification reaction by refluxing to effect the removal of water with an azeotropic distillation agent, such as anisole (methyl phenyl ether) to form the corresponding fluoro derivative $$CH_3CH_2CH_2-O-C(=O)-\text{[tetrachlorophenyl]}-C-O-$$
$$CH_2CH_2CH_2-O-C(=O)-\text{[tetrafluorophenyl]}-C(=O)-OCH_2CH_2CH_2-$$
$$O-C(=O)-\text{[tetrachlorophenyl]}-C(=O)-OCH_2CH_2CH_3$$

EXAMPLE 13

The following example relates to the use of the dimer
$$CH_3CH_2CH_2CH_2O-X-O-CH_2CH_2CH_2-O-X-O-CH_2CH_2CH_2CH_3$$
in which X corresponds to the formula

[structure: tetrachlorophenylene with -C(=O)- groups on each side]

in gas-liquid chromatographic separation. Use is made of a column 8 feet long having an outside diameter of three-sixteenths inch and an inside diameter of one-eighth inch. The column was packed with a total of 8.05 grams of 80–100 mesh firebrick wet with 8 percent by weight of the aforementioned dimer as the liquid phase.

A mixture of benzene, toluene, ethyl benzene, O-xylene and 1-methyl-3-ethyl benzene and 1-methyl-4-ethyl benzene was processed through the column over a period of 10 minutes to effect separation between the 1-methyl-4-ethyl benzene from the 1-methyl-3-ethyl benzene and the remainder.

The mixture was processed through the column with helium as the sweep gas at the rate of about 40 ml. per minute under the following temperature conditions, namely: temperature of the column 109.9° C.; detector 162° C., and injector 135° C. The chromatogram for the separation was effected with samples of 0.55 microliters and a chart speed of 0.6 inch per minute. The chromatogram, included as a figure in this application, identifies the peaks and indicates that a separation was effected adequate for analysis of the components, using a peak-height method.

It will be apparent from the foregoing that I have provided new and improved tetrahaloterephthalate esters which find use in improved gas-liquid chromatographic separations of organic compounds.

It will be understood that changes may be made in the details of formulation and operation without departing from the spirit of the invention, especially as defined in the following claims.

I claim:
1. A compound having the formula
$$R - O - X - (OR' - OX)_n - OR$$
wherein X is a group of the formula

[structure: phenylene with Y substituents at 4 positions and -C(=O)- groups on each side]

in which Y is selected from the group consisting of chlorine and fluorine; R is selected from the group consisting of an alkyl group containing one to 20 carbon atoms, a cycloalkyl group containing up to 20 carbon atoms, an alkaryl group containing up to 20 carbon atoms and halogen and hydroxy-substituted derivatives thereof; R' is a divalent group selected from the group consisting of an alkylene group, a cycloalkylene group, an alkarylene group containing up to 20 carbon atoms and halogen-substituted derivatives thereof; and n is an integer from 1 to 5.

2. A compound as defined in claim 1 wherein R is an alkyl group containing one to 20 carbon atoms.

3. A compound as defined in claim 1 wherein R' is an alkylene group containing one to 20 carbon atoms.

* * * * *